(12) United States Patent
Guichard et al.

(10) Patent No.: US 7,870,604 B1
(45) Date of Patent: Jan. 11, 2011

(54) METHODS AND APPARATUS TO CONFIGURE NETWORK NODES SUPPORTING VIRTUAL CONNECTIONS

(75) Inventors: James N. Guichard, Groton, MA (US); Michael H. Behringer, Madrid (ES)

(73) Assignee: Cisco Technology, Inc., San Jose, CA (US)

( * ) Notice: Subject to any disclaimer, the term of this patent is extended or adjusted under 35 U.S.C. 154(b) by 1081 days.

(21) Appl. No.: 10/652,058

(22) Filed: Aug. 29, 2003

(51) Int. Cl.
*G06F 9/00* (2006.01)

(52) U.S. Cl. .................................................. 726/15
(58) Field of Classification Search .................. 726/15
See application file for complete search history.

(56) References Cited

U.S. PATENT DOCUMENTS

| | | | |
|---|---|---|---|
| 5,195,130 A | 3/1993 | Weiss et al. ............. 379/93.19 |
| 5,319,710 A | 6/1994 | Atalla et al. ................. 705/75 |
| 6,119,234 A | 9/2000 | Aziz et al. .................... 713/201 |
| 6,487,167 B1 * | 11/2002 | Shaio ......................... 370/392 |
| 6,502,192 B1 | 12/2002 | Nguyen ...................... 713/201 |
| 6,629,243 B1 | 9/2003 | Kleinman et al. ............ 713/163 |
| 6,650,640 B1 | 11/2003 | Muller et al. ............... 370/392 |
| 7,203,844 B1 * | 4/2007 | Oxford ....................... 713/193 |
| 2004/0240669 A1 * | 12/2004 | Kempf et al. ............... 380/277 |

\* cited by examiner

*Primary Examiner*—Jacob Lipman
(74) *Attorney, Agent, or Firm*—Brinks Hofer Gilson & Lione

(57) ABSTRACT

A computer system includes functionality enabling a provider edge router to determine whether network data such as VRF information is properly associated with a corresponding virtual private network. A first node through which the network data is transmitted generates a signature value uniquely associated with the virtual private network. The first node forwards the signature value along with the network data to a second node of the physical network. The second node, in turn, verifies that the network data (such as VRF information) is properly associated with the second node (and virtual network) based on its own generation of a signature value, which is compared with the signature value received from the first node.

27 Claims, 7 Drawing Sheets

METHODS AND APPARATUS TO CONFIGURE NETWORK NODES SUPPORTING VIRTUAL CONNECTIONS

BACKGROUND

Virtual Private Networks (i.e., VPNs) provide a secured means for transmitting and receiving data between network nodes even though a corresponding physical network supporting propagation of the data is shared and accessible by many users. Data transmitted between such network nodes (e.g., edge nodes of a service provider network) may or may not be encrypted prior to transmission across the physical network to protect against eavesdropping and tampering by unauthorized parties. Because such a physical network is shared, overall costs of using network resources is generally reduced.

In one application, the overall physical network includes (at its core) a service provider network such as a wide area network. Depending on configuration settings, the service provider network may support VPN connectivity between autonomous (or private) networks or groups of networks under a common administration. For example, networks disposed at two different sites across a service provider network may be selectively connected based on VPN links supported by the core service provider network.

A service provider network topology may include peripherally located provider edge routers, each of which couples to one or multiple customer edge routers. The customer edge routers, in turn, may couple to private local area networks associated with one or multiple customers. As discussed, the service provider network selectively couples the local area networks to each other through links created between the provider edge routers. The provider edge routers typically maintain configuration data such as Virtual Routing and Forwarding (VRF) information dictating how to route and forward traffic through the shared physical network to support corresponding VPNs.

Certain VPNs such as those supported by RFC2547 (Request For Comments 2547) do not require that PE-CE (Provider Edge-Customer Edge) sessions or PE-PE (Provider Edge-Provider Edge) sessions be authenticated. However, if deployed, conventional route authentication may involve a three step process. For example, end-to-end route authentication between a first and a second customer edge router may include: i) routing MD5 authentication between the first customer edge router and a corresponding first provider edge router, ii) routing MD5 authentication between the first provider edge router and a second provider edge router in a service provider network, and iii) routing MD5 authentication between the second provider edge router and second customer edge router.

Based on this technique of authenticating VPNs and associated VRF data at intermediate supporting nodes (e.g., CE-PE, PE-PE, and PE-CE sessions) of the physical network, attributes such as the VRF information associated with corresponding virtual private networks can be modified in response to corresponding customers requesting support for different VPN topologies. Typically, it is up to the service provider to ensure that VRF information stored at provider edge routers are properly updated and maintained to ensure appropriate connectivity between the autonomous local area networks coupled to the customer edge routers.

SUMMARY

Unfortunately, there are deficiencies associated with conventional techniques of configuring edge routers with VRF information to support virtual network connections or VPNs. For example, an edge router of the service provider network can be inadvertently configured with improper VRF information such that two unintended local area networks have access to each other. In such a case, the service provider may be liable for allowing improper access of one customer's private network by another customer.

One conventional method of configuring edge routers of the service provider network is to employ the three-step process as described in the background above. As discussed, proper access control between VPNs depends on the accurate configuration of route targets of the provider edge routers. If the service provider receives a request to update a VPN and updates VRF information at the wrong provider edge router, it is quite possible that an improper VPN may be created between or among wrong combinations of local area networks coupled to the customer edge routers. Such a misconfiguration can mistakenly connect two VPNs with the effect that the separation and thus the security of both VPNs is critically jeopardized. This type of error is sometimes difficult for a customer's network to detect. Consequently, considerable time may pass before detecting a connectivity error, thus resulting in irreparable harm to associated databases in both VPNs otherwise intended to be secured.

One possible solution for avoiding the ill effects of improperly configuring edge routers based on incorrect VRF information is to install and execute IPsec [RFC2401] on all customer edge routers. Unfortunately, installing IPsec on all customer edge routers to support security across a shared physical network is burdensome.

It is an advancement in the art to provide an apparatus and method for ensuring that nodes (such as provider edge routers of a service provider network) are appropriately configured with routing policy information (such as VRF information) so that two local area networks are not mistakenly provided access to each Accordingly, one embodiment of the present invention involves providing functionality in a computer system (e.g., a data communication device) to enable a router to determine whether network data such as VRF information is properly associated with a corresponding virtual network.

In general, this involves generating a signature value uniquely associated with a virtual network at a first node. The first node forwards the signature value along with the network data to a second node of the physical network. The second node, in turn, verifies that the network data (such as VRF information) is properly associated with the second node (and virtual network) based on the signature value received from the first node. Thus, in the context of a service provider network supporting a VPN through the first and second nodes, this technique of utilizing a signature value associated with a virtual network ensures that two unintended networks are not inadvertently provided access to each other.

According to one embodiment, the first node generates the signature value based upon a retrieved data value such as a generated random number. For example, the first node may obtain or reuse a key (such as an MD5 key that is also used at the first node for PE-CE routing authentication) associated with the corresponding virtual network for which VRF information shall be updated. Thereafter, the first node applies an appropriate hash function (potentially depending on the key)

to the random number to produce the signature value. Note that the hash function is optionally an MD5 hash function as defined in RFC2104 and the identified key is optionally a key or one of multiple keys associated with a virtual network supported by the service provider network.

After generating the signature value, the first node transmits the signature value to a target node such as the second node as indicated by an administrator of at least a portion of the physical network. In addition to the signature value generated at the first node, the first node additionally transmits the data value and an identifier of the key (which is potentially one of many keys) associated with the first virtual network to the second node. In one application, the first node transmits the data value, the signature value and the key identifier according to an interautonomous system routing protocol such as BGP (Border Gateway Protocol). One purpose of BGP is to disseminate routing policy information among nodes in a service provider network.

On the receiving end (such as the second node), the second node generates another (or second) locally generated signature value based on the received data value and key identifier. For example, the second node obtains a unique key (e.g., a routing key of a CE router that is to receive routes within the update message) associated with the first virtual network (e.g., VPN) based on a value of the key identifier and applies an appropriate hashing function to the received data value to produce the second signature value. The signature value received from the first node is then compared to the signature value generated at the second node.

If the signature value generated at the second node matches the signature value as received from the first node, it is known that the network data (such as VRF information) is properly associated with the first virtual network. Consequently, in the context of a service provider network supporting a VPN through the first and second nodes, the second node stores the VRF information to support the first virtual network.

Conversely, if the signature value generated at the second node does not match the signature value received from the first node, it is known that the network data such as VRF information is not associated with the first virtual network and the network data was improperly targeted to the second node. This may occur as the result of a service provider incorrectly transmitting the network data to the wrong target node in the physical network. For example, the first node may incorrectly send the network data (such as VRF information) to the second node instead of a third node of the physical network. In response to detecting improperly targeted network data at a receiving node, the receiving node does not store the VRF information to support the first virtual network. Instead, the receiving (second) node generates a message to the first node (and/or corresponding system administrator) that there was an attempt to create an improper virtual network (including the first and second nodes).

One embodiment of the present invention is directed to a computer program product that includes a computer readable medium having instructions stored thereon for ensuring appropriate routing of network data associated with a virtual network. The instructions, when carried out by a processor of the data communication device, cause the processor to perform the steps of: i) receiving network data associated with a first virtual network of the physical network; ii) generating a signature value uniquely associated with an identity of the first virtual network; and iii) transmitting the network data associated with the first virtual network and the signature value to a second node in the physical network, the signature value enabling the second node to verify that the network data is properly associated with the first virtual network.

Another embodiment of the present invention is directed to a computer program product that includes a computer readable medium having instructions stored thereon for ensuring appropriate routing of network data. The instructions, when carried out by a processor of the data communication device, cause the processor to perform the steps of: i) receiving a first signature value from a sending node of the physical network, the first signature value uniquely associated with an identity of the first virtual network; ii) receiving a data value from the sending node of the physical network; iii) generating a second signature value based, at least in part, on the data value received from the sending node; and iv) comparing the received first signature value and generated second signature value to identify whether the network data is properly associated with the first virtual network.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
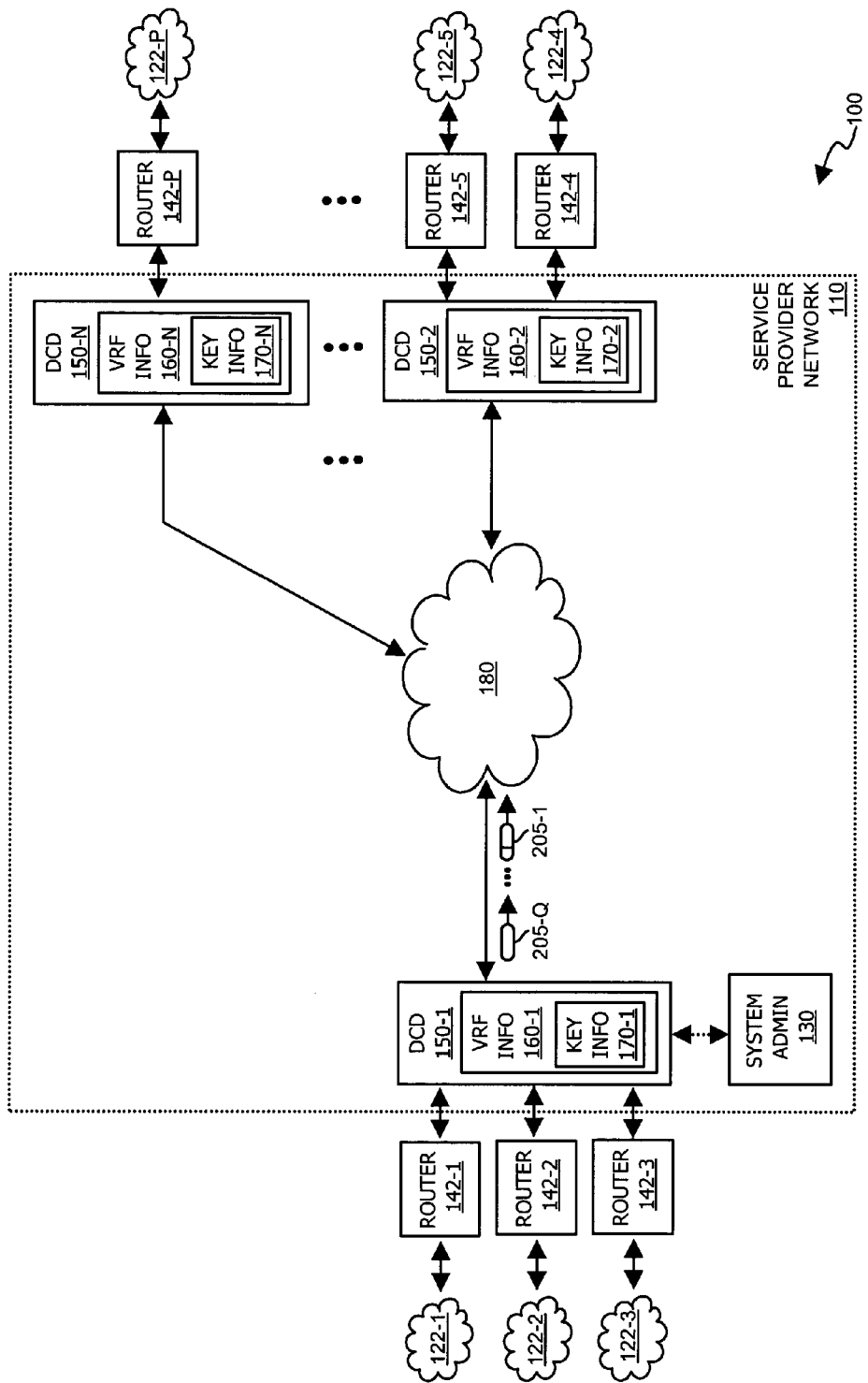
FIG. 1 is a functional block diagram illustrating a communication system supporting configuration of nodes according to an embodiment of the invention.

Provider Edge (PE) routers in a Layer-3 VPN network based on [RFC2547] can lead to security breaches of connected VPNs. For example, the PE routers can be inadvertently configured with improper VRF information such that two unintended local area networks have access to each other. In such a case, the integrity of data information stored at the unintended local area networks may be compromised as a result of inadvertently allowing improper access of one customer's private network to another customer. Notably, conventional layer-3 VPN architectures defined in [RFC 2547] do not provide mechanism to determine whether an imported route on a PE router originated from the correct VPN.

As discussed, proper access control between VPNs depends on the accurate configuration of route targets at provider edge routers. If a service provider receives a request to update a VPN and updates VRF information at the wrong provider edge router, it is quite possible that an improper VPN may be created between or among wrong combinations of local area networks coupled to the customer edge routers. This type of error is sometimes difficult to detect within a customer's network coupled to a corresponding customer edge router. Considerable time may pass before detecting such an error, thus, potentially resulting in irreparable harm to a customer's database.

One aspect of the present invention alleviates accidental misconfiguration of VPN parameters on PE routers. The approach is to associate (or assign) one or more authentication keys to a particular VPN, and use existing routing protocol authentication mechanisms [such as RFC2082, RFC2154, RFC2385], to provide PE-CE authentication. PE-PE routing exchanges are validated via routing update signatures. Since a PE router can store several VRFs, the authentication between PEs use the different MD5 keys depending on which VRF's routes need to be verified.

Accordingly, one embodiment of the present invention involves a technique enabling a provider edge router (e.g., a data communication device) to determine whether network data such as VRF information is properly associated with a corresponding virtual network. For example, this involves (at a first provider edge node) generating a signature value uniquely associated with a virtual network to be supported. The first provider edge node generates the signature value based on applying a mathematical function to a data value (such as a generated random) and key (such as a key that is also used in the first node for PE-CE routing authentication) associated with the corresponding VPN. The first provider edge node forwards the signature value, data value, and key identifier along with the network data (e.g., a BGP update message) to a second node of the physical network.

The second node, in turn, verifies that the network data (such as VRF information) shall be stored at the second provider node (and virtual network) based on the signature value received from the first node. More specifically, the second provider edge node generates a signature value based on applying a hash function to the received data value depending on the key identifier. The key identifier identifies a routing key of a CE router that is to receive the routes contained in the update message. This VPN specific key is used to sign the data value locally on the second node. If the signature value generated at the second node matches the signature value received from the first provider edge node, it is known that the network data such as VRF information is properly targeted to the second provider edge node.

In the context of a service provider network supporting a VPN through the first and second nodes, this technique of utilizing a signature value associated with a virtual network ensures that two unintended networks are not inadvertently provided access to each other through the service provider network.

Although the techniques described herein can be used in networking applications, and particularly to verify the proper configuring of network nodes supporting virtual networks, the techniques discussed herein are also well-suited for other applications as well.

FIG. 1 is a block diagram of communication system 100 according to one embodiment of the present invention. As shown, communication system 100 is a physical network including networks 122-1, 122-2, ..., 122-P (such as local area networks) coupled to service provider network 110 via routers 142-1, 142-2, ..., 142-P (such as customer edge routers). Service provider network 110 includes core network 180 interconnecting Data Communication Devices (DCDs) 150-1, 150-2, ..., 150-N (such as service provider edge routers).

In general, service provider network 110 supports virtual networks (a.k.a., virtual network connections) between networks 122 such as LANs (Local Area Networks) associated with potentially the same or different customers. For example, network 122-1 and network 122-5 may be owned and operated by the same customer having sites located in different cities. In this instance, corresponding routers 142-1 and 142-5 (such as customer edge routers) act as a gateway for message transport between corresponding networks 122-1 and 122-5. DCDs 150 include VRF information 170 identifying a policy for routing information between and among networks 122. Notably, service provider network 110 and, more specifically, data communication devices 150 are configurable to support communication of data packets according to different routing policies.

In one embodiment, service provider network 110 supports VPNs (e.g., Virtual Private Networks) among networks 122 and, more specifically, corresponding (edge) routers 142. In this context, messages originating at a network 122 pass through a corresponding gateway of a sending (customer edge) router 142 to service provider network 110. The messages then travel through a VPN such as a secured tunnel supported by service provider network 110 to an appropriate receiving (customer edge) routers 142 associated with a corresponding destination network 122. VRF info 170 in DCDs 150 indicates a policy for routing and forwarding data through service provider network 110.

As mentioned, service provider network 110 may support multiple virtual networks. For example, data communication devices 150 can be configured with configuration data such as VRF information 160 to support one or multiple VPNs between network 122-1 and network 122-5 for one customer. At the same time, data communication devices 150 can be configured to support a VPN between network 122-2 and network 122-4 for another customer. Shared use of service provider network 110 reduces costs of using resources provided by service provider network 110. Supporting VPNs between different networks 122 prevents improper access by unauthorized parties.

Data communication devices 150 (such as provider edge routers) include VRF (Virtual Routing & Forwarding Instance) information 160 and key information 170. As mentioned, data communication devices 150 utilize corresponding VRF information 160 to route data messages through service provider network 110 to the appropriate network 122 according to a specified policy. For example, messages transmitted through service provider network 110 for a particular PE-PE (Provider Edge) router connection (such as a connection between two data communication devices 150) may be encrypted according to a selected encryption type to maintain confidentiality of transmitted data.

As an illustrative example, suppose that DCDs 150 in service provider network 110 store appropriate VRF information 160 to support a virtual private network between network 122-1 and network 122-5. Networks 122 (or a node on a corresponding LAN such as a personal computer) generate messages such as data packets according to TCP/IP (Transmission Control Protocol/Internet Protocol). The messages generated by network 122-1 pass through (customer edge) router 142-1 to DCD 150-1.

Upon receipt and inspection of a destination address in the message, DCD 150-1 determines that the message from network 122-1 in this particular example belongs to a VPN (based on a procedure of referencing VRF information 160-1 in a VRF lookup table). DCD 150-1 forwards the messages through service provider network to DCD 150-2. In turn, DCD 150-2 receives the message and forwards it through (customer edge) router 142-5 to the appropriate destination node of network 122-5 (such as a target host computer of network 122-5 to which the message is directed). In a similar manner but in a reverse direction, service provider network 110 supports communication of messages generated by network 122-5 to network 122-1. Other network messages may pass through service provider network 110 between and among networks 122 based on VRF information 160. Thus, virtual networks need not provide secured connectivity. In some instances, messages are routed across service provider network with encryption.

VRF information 160 may change depending on which networks 122 service provider network 110 supports. For example, service provider network 110 may initially support a VPN between network 122-1 and network 122-5 as previously discussed. Upon receiving a request from a customer, VPNs (and corresponding VRF information) may be updated or modified so that network 122-1 connects (via a new VPN) to network 122-4 in addition to or instead of network 122-5. Additionally, VRF information 160 may be updated to support an additional VPN such as a secured link between network 122-3 and network 122-P.

One embodiment of the present invention involves verifying that network data associated with VPN routing information properly belongs to a particular VPN before a router's (or data communication device's 150) corresponding VRF information 170 is updated. This may be achieved, at least in part, by reusing a key (such as an MD5 key) for authentication of network data transmitted in service provider network 110. For example, a customer may configure a corresponding (customer edge) router 142 based on a use of a key associated with a particular VPN. Service provider network 110 may configure DCDs 150 (such as provider edge routers) or PE-PE (Private Edge Router-Private Edge Router) connections based on use of the same key used for PE-CE (Provider Edge-Customer Edge) routing authentication. This technique of reusing the same key for PE-PE authentication reduces the need for software upgrades.

As previously discussed, configuration errors in DCDs 150 can result in security breaches of databases associated with networks 122. In one embodiment, DCD 150 verifies local and remote routing information before it installs new VPN routes in corresponding VRF tables 160. More specifically, one method of verifying that network data such as updated VRF information belongs to a particular receiving node involves including a new attribute or "Update Authenticator" to a message distributed by a service provider disseminating routing policy information. The new attribute is sent along with message 205-1 (i.e., VRF information update notification message) so that a receiving node may verify that corresponding VRF belongs to a particular VPN.

In one application, message 205-1 or part thereof is encoded according to BGP (Border Gateway Protocol). Generally, BGP is an interautonomous system routing protocol for exchanging routing information (associated with autonomous networks such as networks 122) among routers such as DCDs 150 in service provider network 110. The BGP Update messages, as defined in RFC 1771, are sent between DCDs 150 (or BGP route reflectors) and include an update authenticator attribute (such as update authenticator attribute 220 in FIG. 2) to verify the proper routing of target route information. The update authenticator attribute may be registered with LANA according to procedures defined in [RFC2042]. Additionally, in one embodiment, the update authenticator attribute 220 is an optional, transitive BGP attribute with an assigned attribute code value.

Figure 2:
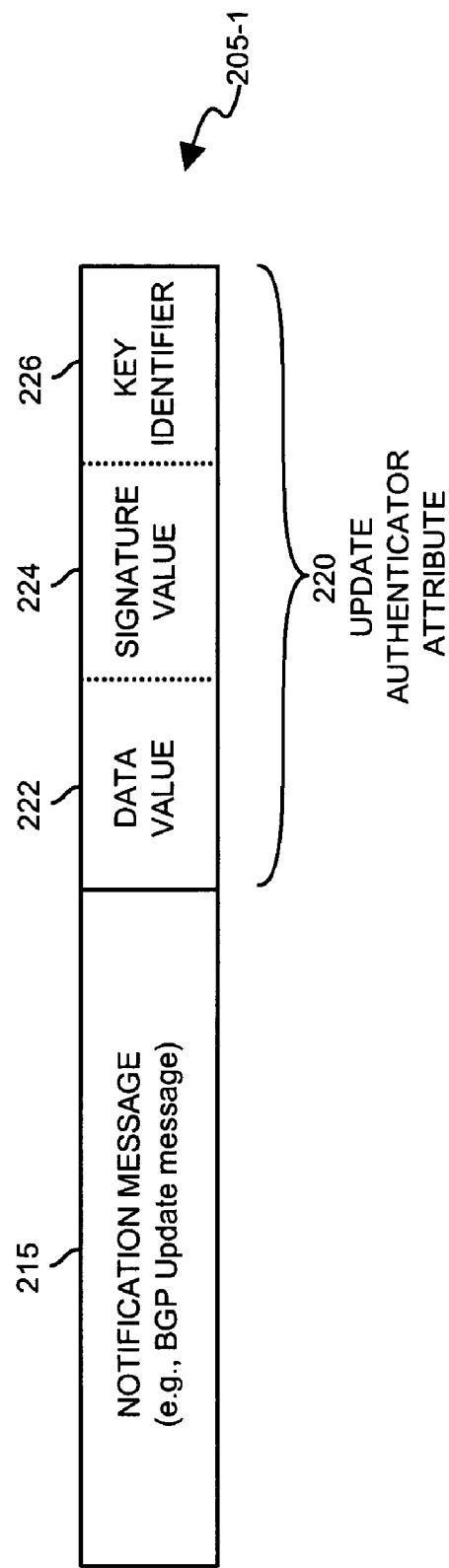
FIG. 2 is a message formatted according to an embodiment of the invention.

FIG. 2 is a diagram illustrating update authenticator attribute 220 associated with message 205-1 for verifying that routing policy information such as VRF information is appropriately targeted for storage in a particular DCD 150 to support a corresponding VPN. Suppose that DCD 150-1 receives a request from a customer (or other source) to support a VPN between network 122-1 and network 122-4. According to a conventional technique, administrator 130 overseeing service provider network 110 would receive the request and send a notification to a corresponding DCD 150-2 to update its corresponding VRF information 160-2. If the VRF information 160 is incorrectly sent to the wrong target node such as DCD 150-n, two potentially unexpected networks 122-1 and 122-4, each associated with different customers, may be inadvertently provided access to each other. For example, system administrator 130 may incorrectly target DCD 150-N with VRF information that should have otherwise been targeted to DCD 150-2. In this case, the improper targeting of VRF information to DCD 150-N would support an inappropriate VPN between network 122-1 and network 122-P.

The inclusion of update authenticator attribute 220 (such as appended data) to a (VRF info update) notification message 215 (e.g., a BGP update message) ensures that VRF information (such as network data transmitted in message 205-1 or message 205-Q) is properly targeted to a particular DCD 150 and corresponding VPN. Update authenticator attribute 220 for verifying a target route includes data value 222, signature value 224 (such as an HMAC MD5 signature), and key identifier 226.

In one embodiment, data value 222 (e.g., a 4 byte value) is a random number generated by a corresponding DCD 150 disseminating routing policy information through service provider network 110. Key identifier 226 (e.g., a 4 byte value) identifies a unique key (such as an MD5 authentication key or routing key of a customer edge router 142 that is to receive the routes contained in BGP update messages) associated with a particular VPN to be updated or created. Key information 170-1 stored among each of the DCDs 150 includes a table that maps key identifiers to corresponding unique keys associated with the VPNs or (CE) routers 142.

Prior to disseminating routing policy from a node in service provider network 110, a corresponding DCD 150 may check whether a target PE router (DCDs 150) can confirm route receipt from each CE router attached to the VRF. If Layer-3 Import/Export is enabled, the corresponding DCD 150 generates signature value 224 (e.g., a 16 byte value) by applying a function (such as a HMAC MD5 hash function) to data value 222 (such as a random number or local route target values) based on a key associated with the VPN as identified by key identifier 226. Note that a key identifier may be a routing target address. Thus, based on this technique, a sending node such as DCD 150-1 generates signature value 222 uniquely associated with a VPN and sends message 205-1 including signature value 222 to a receiving node (such as DCD 150-2) based on a target address as provided by service provider 130. As discussed, the target address associated with disseminated routing policy information may be incorrect as a result of an error by service provider 130. Message 205-1 (such as a BGP update as defined in RFC 2858 incorporated herein by this reference) may be sent to any [RFC2858] BGP peers (other PE routers or BGP route reflectors).

Upon receipt of notification message 215 including update authenticator attribute 220 at a receiving node (e.g., DCD 150-2), the receiving node processes update authenticator attribute 220 to ensure that (VRF info update) notification message 215 (and any network data such as related VRF data in the same or other messages) has been properly targeted to a destination such as DCD 150-2. For example, DCD 150-2 receives message 215 including VRF information updates. Prior to updating corresponding VRF information 160-2 at DCD 150-2, DCD 150-2 verifies that newly received VRF information is associated with a purported VPN to support communications between network 122-1 and network 122-5.

Verification at DCD 150-2 (or other device receiving such a message) includes retrieving data value 222 from received message 205-1 and applying the same function as on the ingress router (such as a hash function supporting MD5 authentication as defined in RFC 2104) to data value 222 based on a key value locally configured and associated with key identifier 226 (identifying a corresponding VPN associated with message 215 or routing key of the CE router 142 that is to receive the routes contained in message 205-1) to produce a locally generated signature value. DCD 150-2 compares its locally generated signature value (based on the technique just discussed) to signature value 224 as received in message 250-1. If the locally generated signature value (at receiving node, DCD 150-2) matches signature value 224 received in message 205-1, DCD 150-2 concludes that VRF information associated with notification message 215 shall be stored along with VRF information 160-2 to support a VPN (in service provider network 110) between network 122-1 and network 122-5. Thus, based on this technique, although a service provider may identify a target address for storing routing policy information, a receiving node (such as DCD 150-2) does not update its VRF information 160-2 until after verifying that signature value 224 properly indicates that a VRF information is associated with a particular VPN supported by the receiving node.

If the signature value 224 received along with notification message 215 does not match the locally generated signature value as generated, by DCD 150-2, DCD 150-2 does not store corresponding VRF information in VRF table 160-2. Instead, since the signature values do not match, DCD 150-2 notifies system administrator 130 of the mis-targeted VRF information so that the error can be corrected. Based on this technique, two unrelated networks are not inadvertently provided access to each other as a result of a system administrator 130 improperly targeting VRF information 160 to the wrong DCD 150.

When a Service Provider manages the (CE) routers 142, the Service Provider configures the key information at the (CE) routers 142, which should match with any directly connected downstream customer routers within a customer site such as network 122. If the customer routers have a different key than the (CE) router 142, then the CE will not authenticate any routes from within the site, and will therefore not advertise any routing information to the PE router. The PE router is thus able to use the previously described mechanisms and will not import/export any routes from/to the customers VRF.

There are typically two types of Extranets that can be defined using the [RFC2547] architecture as used according to an embodiment of the invention; Central Services Extranet and Distributed Extranet.

The Central Services Extranet provides connectivity between spoke VPN sites through a central PE router. Such a PE router carries routes for all members of the extranet, whereas spoke PE routers carry only local routes, and a route to the central PE router. To support this type of configuration, the central PE router carries <key, key-identifier> mappings for members of the extranet. On receiving an incoming update such as message 205-1, the central PE is able to identify which key to use on the UPDATE-authenticator attribute 220 by looking at the key-identifier 226 carried within the update.

The Distributed Extranet model provides connectivity directly between members of a given VPN. For example, each PE router that stores information associated with members of an extranet is configured to import the relevant "route-target" values used for export by other members of the VPN. Using the key-identifier 226, a PE router is able to identify which key to use on an incoming update to verify the source. This means that each PE router within the extranet carries <key, key-identifier> mappings for all members of a VPN.

Figure 3:
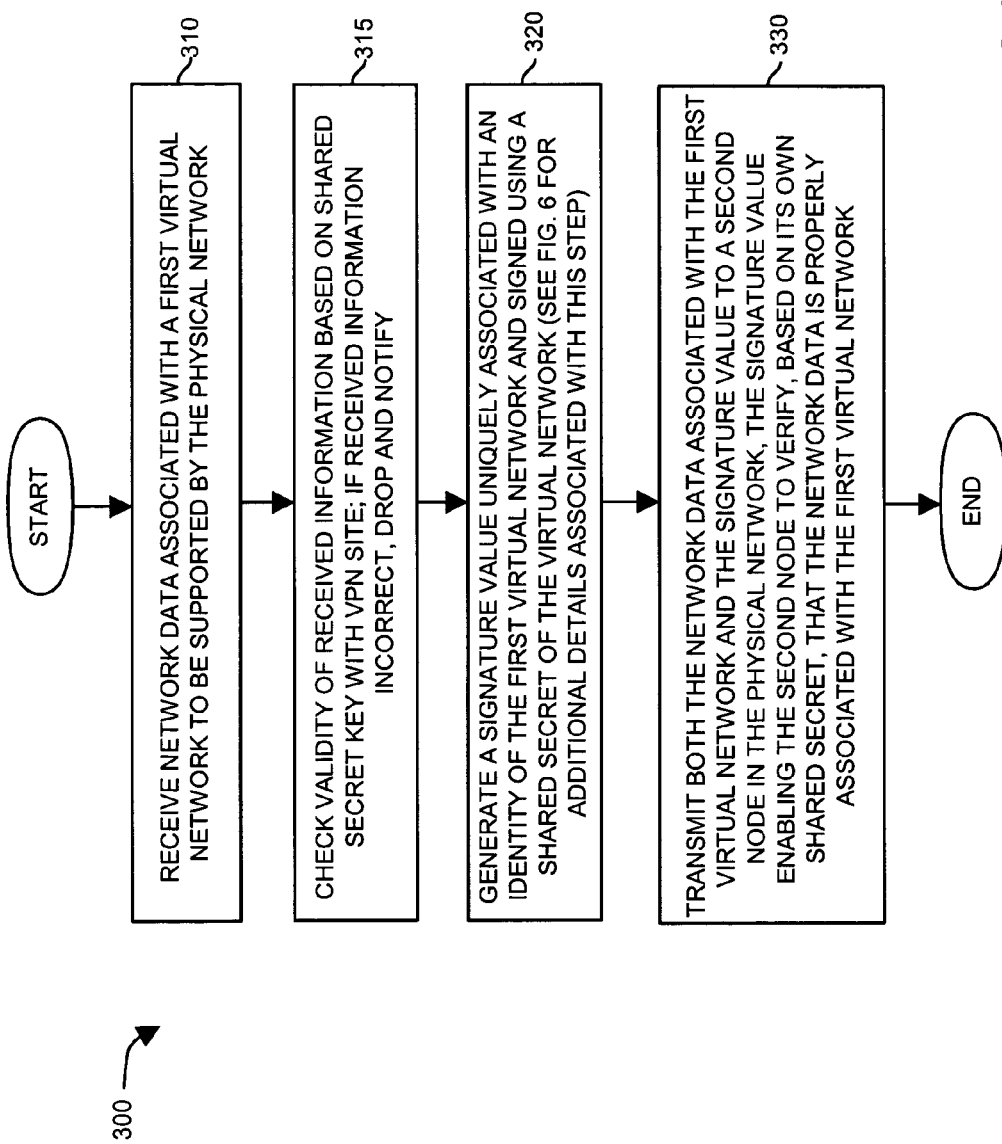
FIG. 3 is a flow chart illustrating a technique for generating a signature value according to an embodiment of the invention.

The above process of ensuring proper configuration of VRF information 160 at DCDs 150 is further described in connection with flowchart 300 and flowchart 400 in respective FIGS. 3 and 4. For example, the flowchart 300 in FIG. 3 identifies a process executed at DCD 150-1 (e.g., PE node number 1) while flowchart 400 identifies a process executed at DCD 150-2 (e.g., PE node number 2) for configuring nodes to support corresponding virtual connections.

One purpose of flowchart 300 is to generate message 205-1 (as shown in FIG. 2) at DCD 150-1 (e.g., PE node number 1). For example, flowchart 300 supports creating an UPDATE-authenticator for a VPN and sending it to a target node such as DCD 150-2 (e.g., PE node number 2). As shown in step 310 (of FIG. 3), DCD 150-1 receives network data associated with a first virtual network supported by service provider network 110. The first virtual network is potentially a new connection or update to a previously existing connection supported by service provider network 110.

In step 315, DCD 150-1 checks a validity of received information based on a shared secret key with VPN site. If the received information is incorrect, the message is dropped and DCD 150-1 notifies the VPN site.

Figure 6:
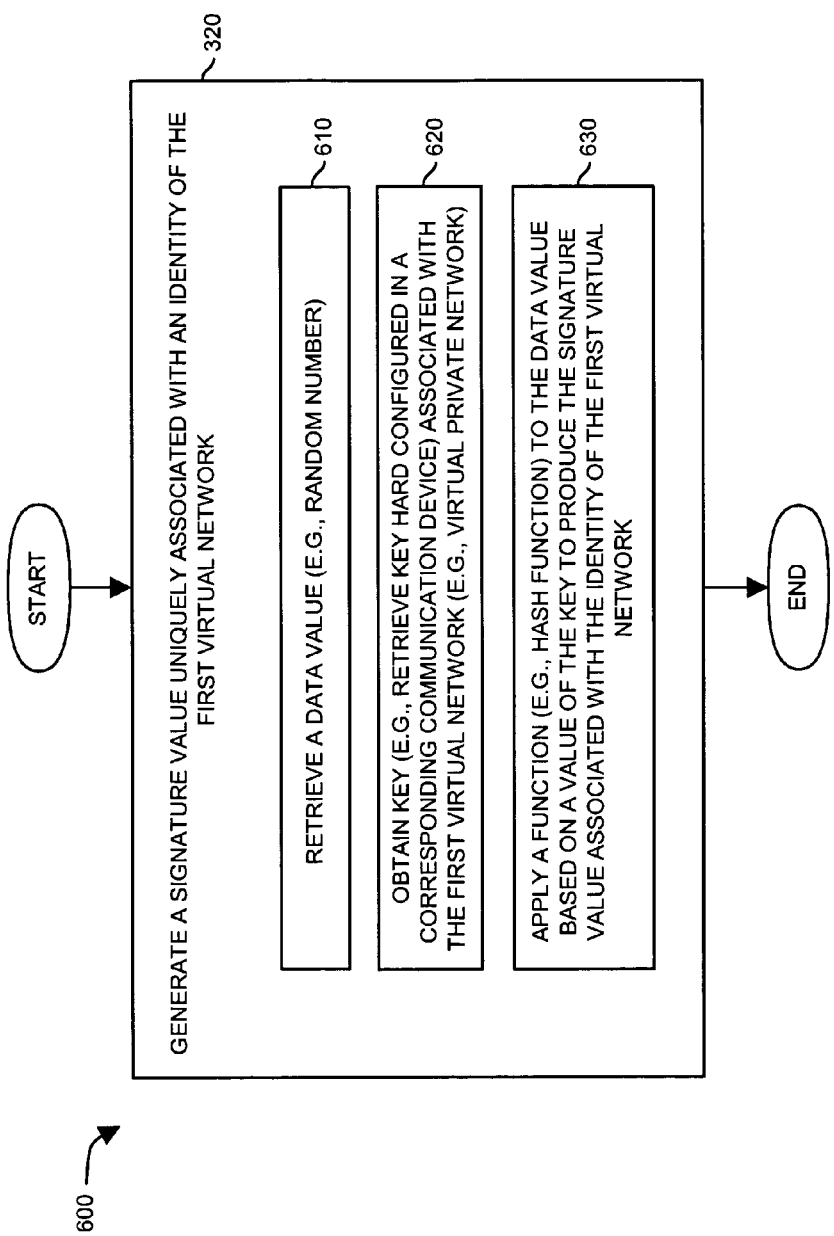
FIG. 6 is a flow chart illustrating a technique for generating a signature value according to an embodiment of the invention.

In step 320, DCD 150-1 generates a signature value uniquely associated with an identity of the first virtual network, and signed using a shared secret (key) of the first virtual network. Additional details associated with step 320 are shown in FIG. 6.

In step 330, DCD 150-1 transmits both the network data associated with the first virtual network and signature value to a second node, e.g., DCD 150-2 which receives signature value 224 in message 205-1 from (sending node) DCD 150-1 of service provider network 110. The signature value enables DCD 150-2 to verify, based on its own shared secret (key), whether the network data is properly associated with the first virtual network.

Figure 4:
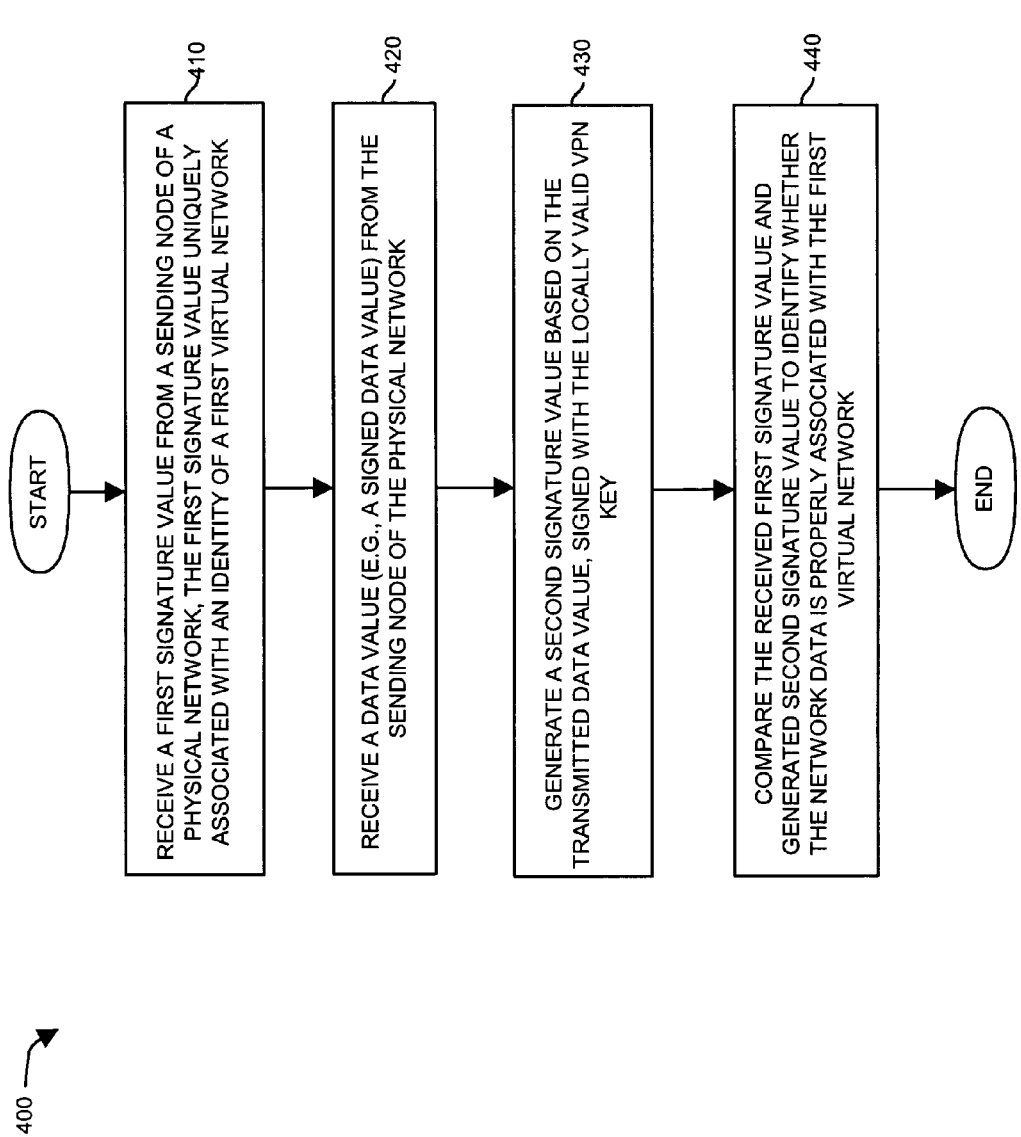
FIG. 4 is a flow chart illustrating a technique for receiving and processing verification data according to an embodiment of the invention.

At a receiving node in step 410 of FIG. 4, a receiving node (such as DCD 150-2) processing the update notification message 205-1 receives a signature value 224 along with update message 205-1. The following steps in flowchart 400 outline a process executed at the receiving node (e.g., a receiving PE node DCD 150-2) whether network data is properly associated with a first virtual network. Note that a more specific technique consistent with FIG. 4 is illustrated and discussed with respect to FIG. 7.

Referring again to FIG. 4, in step 420, DCD 150-2 receives data value 222 (e.g., a signed data value) in message 205-1 from sending node DCD 150-1.

In step 430, receiving node DCD 150-2 generates its own (second or locally generated) signature value, based on transmitted data 222, signed with the locally valid VPN key.

In step 440, receiving node DCD 150-2 compares received signature value 224 to the locally generated signature value generated by DCD 150-2 to identify whether corresponding network data (such as VRF information) is properly associated with the first virtual network and properly targeted to the appropriate provider edge router.

Figure 5:
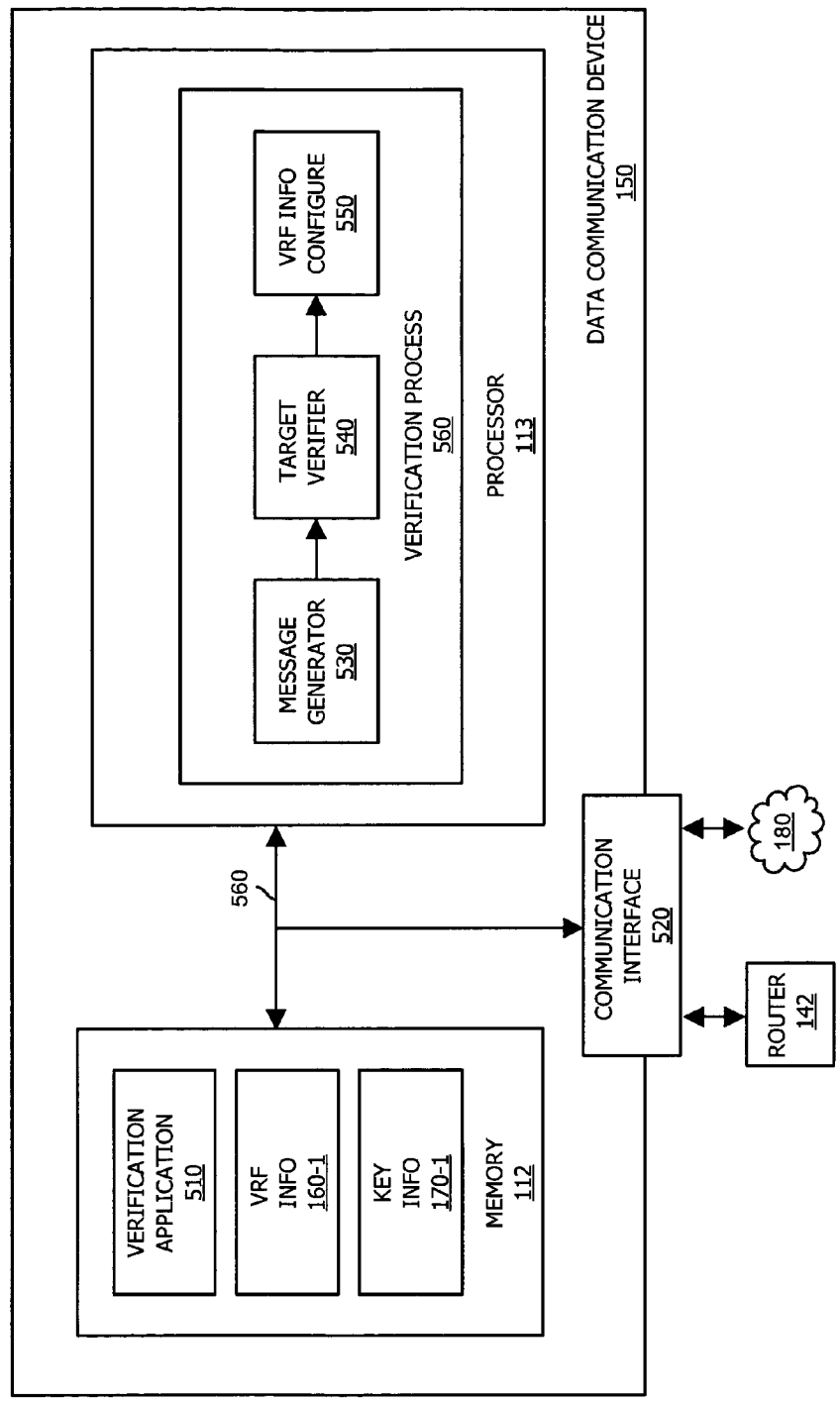
FIG. 5 is a system block diagram of a data communication device supporting configuration according to an embodiment of the invention.

FIG. 5 is a block diagram of data communication device 150 according to an embodiment of the present invention.

As shown, data communication device 150 is a computerized device including interconnect mechanism 560 such as a data bus or other circuitry that interconnects memory 112, processor 113, and communication interface 520. Processor 113 may be any type of central processing unit, microprocessor, processing device, controller of other electronic circuitry capable of accessing verification application 510 to execute, nm, interpret, operate or otherwise perform verification application 510, thus providing verification of targeted data according to embodiments of the invention as explained herein. In other words, verification application 510 may be embodied as a software program that enables provider edge router devices such as DCDs 150 to verify that network data is properly addressed to a target device.

Memory 112 stores verification application 510, VRF information 160, and key information associated with virtual network connections. In general, verification application 510 represents software code, data and/or logic instructions executed by processor 113. When executed, processor 113 creates verification process 560 includes message generation 530, target verification 540, and configuration 550 processes. These processes are executed at DCDs 150 depending on whether a DCD 150 is a sending or receiving node. For example, the message generation 530 process is executed on a sending node (such as DCDs 150-1) to generate messages 205-1, ..., 205-Q which are forwarded through core network 180 to corresponding target DCDs 150. Target verification 540 and configuration 550 processes are executed at a receiving node (such as DCD 150-2) to verify that targeted messages and configure corresponding VRF information 170 if appropriate. These processes are more particularly described in connection with FIGS. 6 and 7.

FIG. 6 is a flowchart 600 more particularly illustrating a method (as previously discussed in FIG. 3) of generating or producing a unique signature value 224 (e.g., UPDATE authenticator) for inclusion in message 205-1 (FIG. 2) according to an embodiment of the present invention. The following steps 610, 620 and 630 are additional sub-steps potentially included in step 320 shown in FIG. 3. For example, a combination of steps in flowchart 300 and flowchart 600 may be performed at DCD 150-1 (e.g., PE node number 1) to generate message 205-1 for transmission to DCD 150-2 (e.g., PE node number 2).

In step 610, sending node DCD 150 retrieves a data value such as a generated random number.

In step 620, sending node DCD 150 obtains or retrieves a locally stored key (e.g., a key that is hard configured on the sending node device) associated the virtual network to be modified or created. This involves reusing a key that is also used at the sending node for PE-CE routing authentication associated with the particular VPN to be updated or newly created. Each of the DCDs 150 stores keys (such as HMAC MD5 authentication keys) associated with VPNs supported by service provider network 110. Thus, when a sending node generates signature value 224 of a message 205-1, it also includes a corresponding key identifier 226. Upon receipt, a receiving node uses key identifier 226 to retrieve a unique key associated with identifier 226 of message 205-1 and corresponding VPN.

In step 630, the sending DCD 150-1 applies a hash function to data value 222 (such as the random number) based on a value of the HMAC MD5 key to produce signature value 224 associated with the identity of the first virtual network. As discussed with respect to FIG. 3, flowchart 600 generates message 205-1 (in FIG. 2) as a result of executing steps 610, 620 and 630 at DCD 150-1 (e.g., PE node number 1). Message 205-1 is forwarded to a target node DCD 150-2 (e.g., PE node number 2) as supplied by system administrator 130 of service provider network 110.

Figure 7:
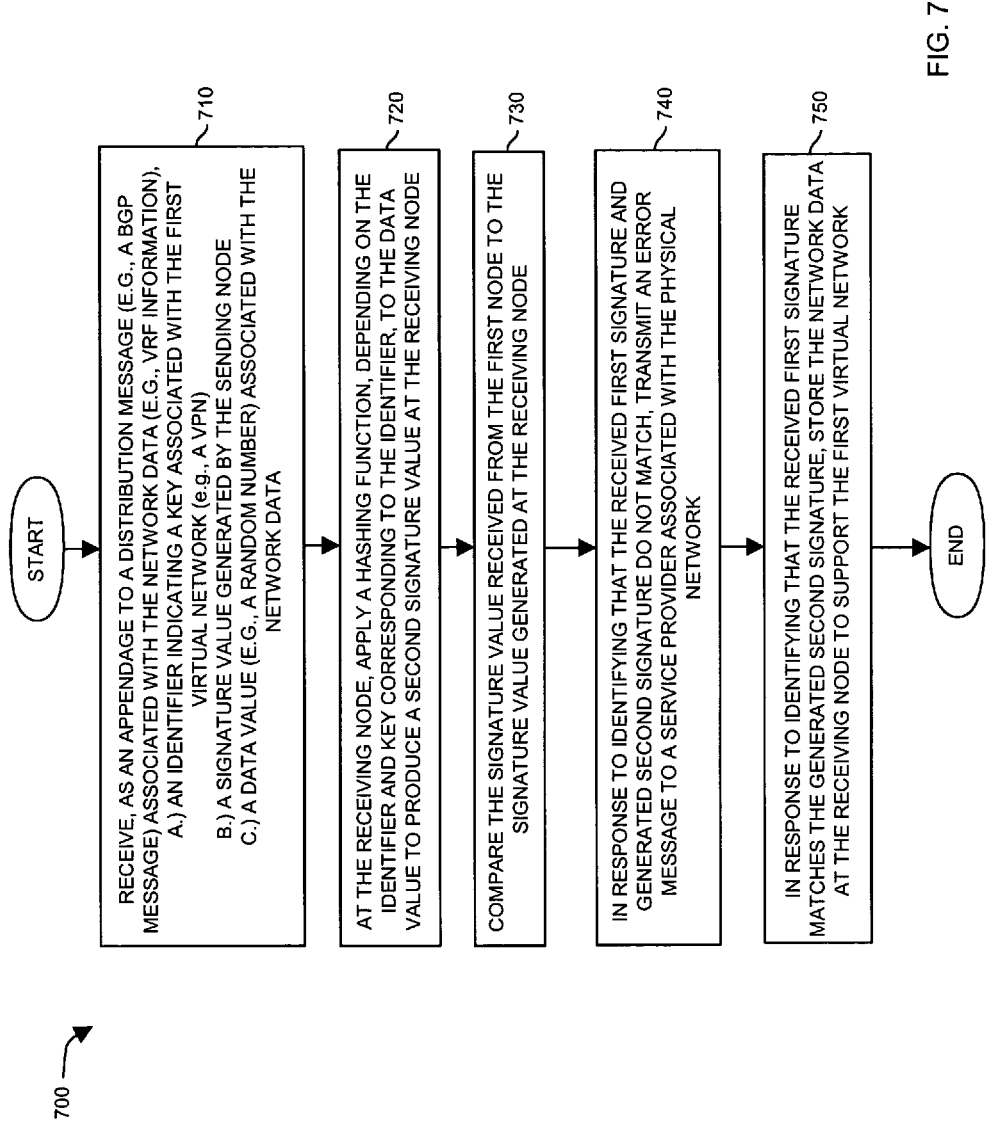
FIG. 7 is a flow chart illustrating a technique for processing received configuration data to ensure proper configuration of nodes according to an embodiment of the invention.

FIG. 7 is a flowchart 700 more particularly illustrating a process (as generally discussed in FIG. 4) of verifying and configuring VRF information at a DCD 150 according to an embodiment of the invention.

In step 710, a receiving node such as DCD 150-2 receives message 205-1. As previously discussed, message 205-1 includes update authenticator attribute 220 such as data value 222, signature value 224, and key identifier 226.

In step 720, receiving node DCD 150-2 applies a hash function to data value 222 based on key identifier 226 also received in message 205-1. For example, receiving node retrieves a unique key (such as a routing key of the CE router 142 that is to receive the routes contained in message 205-1) from key information 170-2 (as identified by key identifier 226) associated with the particular VPN configuration data (e.g., VRF data) to be updated at the targeted receiving node.

In step 730, the locally generated signature value at receiving node is compared to signature value 224 received in message 205-1.

In step 740, the receiving node generates an error message to the service provider if the received signature value 224 does not match the signature value locally generated by the receiving node.

In step 750, the receiving node stores the VRF information in its corresponding memory for configuring VPNs in service provider network 110 if received signature value 224 matches the locally generated signature value at DCD 150-2.

In summary, techniques of the present invention ensure proper configuration of network nodes so that two or more unintended networks are not inadvertently provided access to each other. The inclusion of the update authenticator attribute 220 enables a receiving node to verify that corresponding VRF information is properly directed to a particular network node.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. In a first provider node of a physical network supporting multiple virtual networks, a method for propagating network data, the method comprising:
   receiving network data associated with a first virtual network to be supported by the physical network;
   generating, at the first provider node, a first signature value uniquely associated with an identity of the first virtual network, wherein generating the first signature value includes retrieving a data value, obtaining an encryption key associated with the first virtual network, and applying a function to the data value based on a value of the encryption key to produce the first signature value associated with the identity of the first virtual network; and
   transmitting both the network data associated with the first virtual network and the first signature value to a second provider node in the physical network, the first signature value enabling the second provider node to verify that the network data is properly associated with the first virtual network via generation of a second signature value by the second provider node using a routing key of a customer node and determination of whether the first signature value matches the second signature value by the second provider node, the first virtual network being one of multiple virtual networks supported by the second provider node.

2. A method as in claim 1, wherein the data value is a generated random number.

3. A method as in claim 1, wherein transmitting the network data includes:
transmitting the first signature value, the retrieved data value, and an identifier of the encryption key associated with the first virtual private network to the second provider node in the physical network.

4. A method as in claim 1, wherein the function is a hash function.

5. A method as in claim 1, wherein the physical network includes a service provider network supporting virtual private networks among multiple customers and the network data includes routing information associated with the virtual private networks.

6. A method as in claim 1, wherein the first signature value is transmitted to the second provider node in an encrypted format, and the network data is transmitted to the second provider node in an unencrypted format.

7. A method as in claim 1 further comprising:
generating a notification message to include: i) the network data associated with the first virtual network, and ii) an identifier value specifying an encryption function associated with the first virtual network, the identifier value enabling the second provider node to select one of multiple index values and verify whether the notification message is properly directed to the first virtual network supported by the second provider node; and
wherein transmitting both the network data associated with the first virtual network and the first signature value to the second provider node includes transmitting the notification message to the second provider node.

8. A method as in claim 1 further comprising:
generating a notification message to include: i) the network data associated with the first virtual network, ii) the data value, iii) the first signature value, and iv) an identifier value specifying the encryption key associated with the first virtual network;
wherein transmitting both the network data associated with the first virtual network and the first signature value to the second provider node includes transmitting the notification message to the second provider node; and
inclusion of the identifier value in the notification message enabling the second provider node to verify whether the notification message is associated with the first virtual network based on steps of: i) selecting an encryption key as identified by the identifier value, the encryption key being one of multiple encryption keys associated with the multiple virtual networks supported by the second provider node, ii) applying the selected encryption key to the data value in the notification message to produce the second signature value, and iii) comparing the first signature to the second signature value, iv) updating routing information at the second provider node based on the network data if the first signature value is equal to the second signature value.

9. A method as in claim 1, wherein transmitting the network data and first signature value to the second provider node includes:
transmitting the network data and first signature value to the second provider node in the physical network based on a target destination provided by an administrator of the physical network, the network data and first signature value transmitted along with a message encoded based on a data distribution protocol.

10. A method as in claim 9, wherein the data distribution protocol is an interautonomous system routing protocol and the message includes an update attribute field to store the first signature value, the data value, and a key identifier associated with the first virtual network; and
wherein the first virtual network is a virtual private network.

11. A method as in claim 1 further comprising:
generating a notification message to include: i) the network data associated with the first virtual network, ii) the first signature value, and iii) the retrieved data value.

12. A method as in claim 11, wherein transmitting both the network data associated with the first virtual network and the first signature value to the second provider node includes:
transmitting the notification message to the second provider node, the second provider node using the retrieved data value in the notification message to generate the second signature value, the second provider node verifying whether the notification message includes information associated with the first virtual network by comparing the first signature value with the second signature value.

13. A method as in claim 12 further comprising:
generating the notification message to include an identifier value used by the second provider node to identify which of multiple encryption keys is to be used by the second provider node to apply to the retrieved data value in the notification message to produce the second signature value.

14. A method as in claim 1 further comprising:
transmitting an key identifier indicating one of multiple encryption keys associated with the first virtual network to the second provider node in the physical network, wherein each of the multiple encryption keys is associated with a separate virtual network accessible by the first provider node.

15. A method as in claim 14, wherein the first signature value is generated by applying a hash function to a public data value and a value of the encryption key associated with the key identifier; the method further comprising:
enabling the second provider node to generate the second signature value in order to be compared with the first signature value.

16. A method as in claim 15, wherein the key identifier enables the second provider node to identify and access a corresponding encryption key, if any, associated with the key identifier at the second provider node.

17. A method as in claim 16 further comprising:
enabling the second provider node to apply the hash function to the public data value and the corresponding encryption key, if any, associated with the key identifier to generate the second signature value; and
wherein the second provider node is capable of updating forwarding tables in accordance with the network data upon determining that the second signature value is equivalent to the first signature value, the forwarding tables being updated for the virtual private network associated with the key identifier.

18. A computer system at a first node of a physical network that supports multiple virtual networks, the computer system comprising:
a communication interface that supports communication with other nodes of the physical network;
a processor;

a memory unit that stores instructions associated with an application executed by the processor; and an interconnect coupling the communication interface, the processor, and the memory unit, enabling the computer system to execute the application and perform operations of:

receiving network data associated with a first virtual network of the physical network, wherein the network data includes routing information associated with the first virtual network, the routing information being used to support a secured network connection including a logical connection path;

generating a first signature value uniquely associated with an identity of the first virtual network, wherein generating the first signature includes retrieving a data value, obtaining an encryption key associated with the first virtual network, and applying a function to the data value based on a value of the encryption key to produce the first signature value associated with the identity of the first virtual network; and transmitting, through the communication interface of the computer system, both the network data associated with the first virtual network and the signature value to a second node in the physical network, the signature value enabling the second node to verify that the network data is properly associated with the first virtual network via generation of a second signature value using a routing key of a customer node and determination of whether the first signature value matches the second signature value by the second node.

19. A computer system as in claim 18, wherein the data value is a generated random number.

20. A computer system as in claim 18 that, wherein transmitting the network data, additionally performs an operation of:

transmitting the first signature value, the retrieved data value, and an identifier of the encryption key associated with the first virtual private network to the second node in the physical network.

21. A computer system as in claim 18 that additionally performs an operation of:

transmitting key identifier indicating one of multiple encryption keys associated with the first virtual network to the second node in the physical network, wherein each of the multiple encryption keys is associated with a separate virtual network accessible by the first node.

22. A computer system as in claim 18 that, wherein applying the function includes applying a hash function.

23. A computer system as in claim 18, wherein the physical network includes a service provider network supporting virtual private networks among multiple customers and the network data includes routing information associated with the virtual private networks.

24. A computer system as in claim 18 that, when transmitting the network data and first signature value to a second node, additionally performs an operation of:

transmitting the network data and first signature value to the second node in the physical network based on a target destination provided by an administrator of the physical network, the network data and first signature value transmitted along with a message encoded based on a data distribution protocol.

25. A method as in claim 24, wherein the data distribution protocol is an interautonomous system routing protocol and the message includes an update attribute field to store the first signature value, the data value, and a key identifier associated with the first virtual network; and wherein the first virtual network is a virtual private network.

26. A computer system at a first provider node of a physical network that supports multiple virtual networks, the computer system comprising:

a communication interface that supports communication with other nodes of the physical network;

a processor;

a memory unit that stores instructions associated with an application executed by the processor; and an interconnect coupling the communication interface, the processor, and the memory unit, enabling the computer system to execute the application and provide:

means for receiving network data associated with a first virtual network of the physical network;

means for generating, at the first provider node, a signature value uniquely associated with an identity of the first virtual network, wherein generating the first signature value includes retrieving a data value, obtaining an encryption key associated with the first virtual network, and applying a function to the data value based on a value of the encryption key to produce the first signature value associated with the identity of the first virtual network; and means for transmitting, through the communication interface of the computer system, the network data associated with the first virtual network and the signature value to a second provider node in the physical network, the signature value enabling the second provider node to verify that the network data is properly associated with the first virtual network by determination of whether the first signature value matches the second signature value generated by the second node using a routing key of a customer node.

27. A computer program product including a computer-readable medium having instructions stored thereon for processing data information, such that the instructions, when carried out by a processing device, enable the processing device to perform the steps of:

receiving network data associated with a first virtual network of the physical network;

generating a signature value uniquely associated with an identity of the first virtual network, wherein generating the signature value includes retrieving a data value, obtaining an encryption key associated with the first virtual network, and applying a function to the data value based on a value of the encryption key to produce the signature value associated with the identity of the first virtual network; and transmitting the network data associated with the first virtual network and the signature value to a second node in the physical network, the signature value enabling the second node to verify that the network data is properly associated with the first virtual network by determination of whether the first signature value matches a the second signature value generated by the second node using a routing key of a customer node.

* * * * *

UNITED STATES PATENT AND TRADEMARK OFFICE
CERTIFICATE OF CORRECTION

| | | |
|---|---|---|
| PATENT NO. | : 7,870,604 B1 | |
| APPLICATION NO. | : 10/652058 | |
| DATED | : January 11, 2011 | |
| INVENTOR(S) | : James N. Guichard et al. | |

It is certified that error appears in the above-identified patent and that said Letters Patent is hereby corrected as shown below:

In column 16, claim 27, line 60, after "of whether the" replace "first signature value matches a the" with --signature value matches a--.

Signed and Sealed this
Tenth Day of May, 2011

David J. Kappos
*Director of the United States Patent and Trademark Office*